United States Patent
Richardson et al.

(10) Patent No.: US 7,461,059 B2
(45) Date of Patent: Dec. 2, 2008

(54) DYNAMICALLY UPDATED SEARCH RESULTS BASED UPON CONTINUOUSLY-EVOLVING SEARCH QUERY THAT IS BASED AT LEAST IN PART UPON PHRASE SUGGESTION, SEARCH ENGINE USES PREVIOUS RESULT SETS PERFORMING ADDITIONAL SEARCH TASKS

(75) Inventors: Matthew R. Richardson, Redmond, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/159,623

(22) Filed: Jun. 23, 2005

(65) Prior Publication Data

US 2006/0190436 A1 Aug. 24, 2006

Related U.S. Application Data

(60) Provisional application No. 60/655,583, filed on Feb. 23, 2005.

(51) Int. Cl.
*G06F 17/30* (2006.01)
*G06F 17/00* (2006.01)
*G10L 15/00* (2006.01)

(52) U.S. Cl. ............................. 707/5; 707/3; 707/102; 704/246; 715/259; 715/268; 715/968

(58) Field of Classification Search ............... 707/1, 707/3–5, 10, 100–102, 104.1, 200; 706/50–55; 709/217, 219, 203; 715/258–259, 268, 257, 715/261–262, 700–701, 727–728, 968; 704/246, 704/251, 257

See application file for complete search history.

(56) References Cited

U.S. PATENT DOCUMENTS

| | | | | |
|---|---|---|---|---|
| 5,832,428 A | * | 11/1998 | Chow et al. ................ | 704/254 |
| 5,896,321 A | * | 4/1999 | Miller et al. ........... | 365/189.01 |
| 5,970,455 A | * | 10/1999 | Wilcox et al. ................ | 704/270 |
| 6,178,419 B1 | * | 1/2001 | Legh-Smith et al. ........... | 707/6 |
| 6,363,377 B1 | * | 3/2002 | Kravets et al. ................ | 707/4 |
| 6,408,270 B1 | * | 6/2002 | Garber ........................ | 704/251 |
| 6,460,029 B1 | * | 10/2002 | Fries et al. ..................... | 707/3 |

(Continued)

FOREIGN PATENT DOCUMENTS

WO WO 02/41185 * 5/2002

(Continued)

OTHER PUBLICATIONS

Hermann Ney et al. "Data driven search organization for continuous speech recognition", IEEE transaction on signal processing, vol. 40, No. 2, Feb. 1992, pp. 272-281.*

*Primary Examiner*—Srirama Channavajjala
(74) *Attorney, Agent, or Firm*—Amin, Turocy & Calvin, LLP

(57) ABSTRACT

A system for guiding a search for information is presented. The system comprises a user interface that accepts a phrase and receives at least one suggestion based at least in part on the phrase. The system also includes a phrase suggestion engine that matches the phrase with the at least one suggestion. Methods of using the system are also provided.

10 Claims, 16 Drawing Sheets

U.S. PATENT DOCUMENTS

| | | | |
|---|---|---|---|
| 6,601,061 B1* | 7/2003 | Holt et al. | 707/3 |
| 6,766,320 B1* | 7/2004 | Wang et al. | 707/5 |
| 6,873,982 B1* | 3/2005 | Bates et al. | 707/5 |
| 7,349,950 B2* | 3/2008 | Stephens | 709/217 |
| 2003/0088554 A1* | 5/2003 | Ryan et al. | 707/3 |
| 2003/0233224 A1* | 12/2003 | Marchisio et al. | 704/4 |
| 2004/0093567 A1* | 5/2004 | Schabes et al. | 715/533 |
| 2004/0186827 A1* | 9/2004 | Anick et al. | 707/3 |
| 2004/0246237 A1* | 12/2004 | Asakawa et al. | 345/171 |
| 2005/0144158 A1* | 6/2005 | Capper et al. | 707/3 |
| 2005/0203888 A1* | 9/2005 | Woosley et al. | 707/3 |
| 2005/0249419 A1* | 11/2005 | Rieman | 382/229 |
| 2005/0283468 A1* | 12/2005 | Kamvar et al. | 707/3 |
| 2006/0101037 A1* | 5/2006 | Brill et al. | 707/100 |
| 2006/0161520 A1* | 7/2006 | Brewer et al. | 707/3 |
| 2006/0242138 A1* | 10/2006 | Brill et al. | 707/5 |
| 2006/0248078 A1* | 11/2006 | Gross et al. | 707/5 |
| 2007/0208730 A1* | 9/2007 | Agichtein et al. | 707/5 |

FOREIGN PATENT DOCUMENTS

| | | | |
|---|---|---|---|
| WO | WO 02/103578 | * | 12/2002 |

* cited by examiner

DYNAMICALLY UPDATED SEARCH RESULTS BASED UPON CONTINUOUSLY-EVOLVING SEARCH QUERY THAT IS BASED AT LEAST IN PART UPON PHRASE SUGGESTION, SEARCH ENGINE USES PREVIOUS RESULT SETS PERFORMING ADDITIONAL SEARCH TASKS

CROSS-REFERENCE TO RELATED APPLICATION

This application claims benefit under 35 U.S.C. §119(e) from U.S. Provisional Patent Application Ser. No. 60/655,583, entitled "DYNAMIC CLIENT INTERACTION FOR SEARCH" and filed on Feb. 23, 2005. The entirety of the aforementioned application is hereby incorporated by reference.

BACKGROUND

The amount of data available to information seekers has grown astronomically, whether as the result of the proliferation of information sources on the Internet, or as a result of private efforts to organize business information within a company, or any of a variety of other causes. As the amount of available data grows, so does the need to be able to search through that information to locate specific items. A related problem is the need for users to properly construct queries in order to locate desired information.

Search systems include such systems as web search engines and database interfaces, among others. When a user performs a search for information, that user typically must create and construct a query that the user believes will produce desired results. The creation of such a query is prone to events that can negatively impact the accuracy of search results, such as spelling errors and lack of knowledge of relevant search terms. In many systems, queries may also tend towards long strings that can be unwieldy to enter. These and other factors can increase the time and effort needed to locate desired information.

User interfaces for search functions also impact both the ease of performing a search and the accuracy of search results. A typical interaction today involves a user typing some keywords to enter as a query, performing a search based on those keywords, and viewing the results. The user must predict what is a necessary or sufficient query to obtain desired results. Inaccurate predictions result in undesired results. Queries that are too short may inadequately refine the result set. Queries that are too long may inadvertently exclude desirable results. Queries that use an unfortunate choice of terms or operators may inadequately refine the results or exclude desirable results. A user may have to perform many iterations of this process until desired results are obtained. Therefore, there is a need for systems and methods that can minimize query errors and assist in query creation to perform effective searches.

SUMMARY

The following presents a simplified summary in order to provide a basic understanding. This summary is not an extensive overview. It is neither intended to identify key or critical elements nor to delineate scope. Its sole purpose is to present some concepts in a simplified form as a prelude to a more detailed description that is presented later. Additionally, section headings used herein are provided merely for convenience and should not be taken as limiting in any way.

A user interface is provided that interacts with a user to assist the user during the creation of a search query. This assistance can guide the user during the creation of the query to develop a query that is likely to obtain search results desired by the user. Additionally, the guidance can assist the user by suggesting likely terms that can be used in a search query. Specific instances of assistance or guidance during creation of the query can dynamically change in response to user additions to, or refinements of, the query.

A search system includes a dynamic user interface that guides a user through the creation of a search query. As the query is constructed by the user, the search system provides preliminary results to the user. The user can then terminate the construction of the query and select from among the preliminary results presented. Additionally or alternatively, the user can continue to refine the search query and obtain new or updated search results dynamically as such refinement occurs or within a short duration of time thereafter.

A method of searching is provided. The method includes dynamically suggesting to a user at least one search query that the user may select as the user constructs the search query. The user can add, delete, or change search terms to focus the query to obtain desired results. A preview of results that can be obtained with a current or suggested query allows the user to determine whether the query being constructed will serve the needs of the user.

The disclosed and described components and methods comprise the features hereinafter fully described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such aspects and their equivalents. Variations of the specific implementations and examples presented herein will become apparent from the following detailed description when considered in conjunction with the drawings.

DETAILED DESCRIPTION

Figure 1:
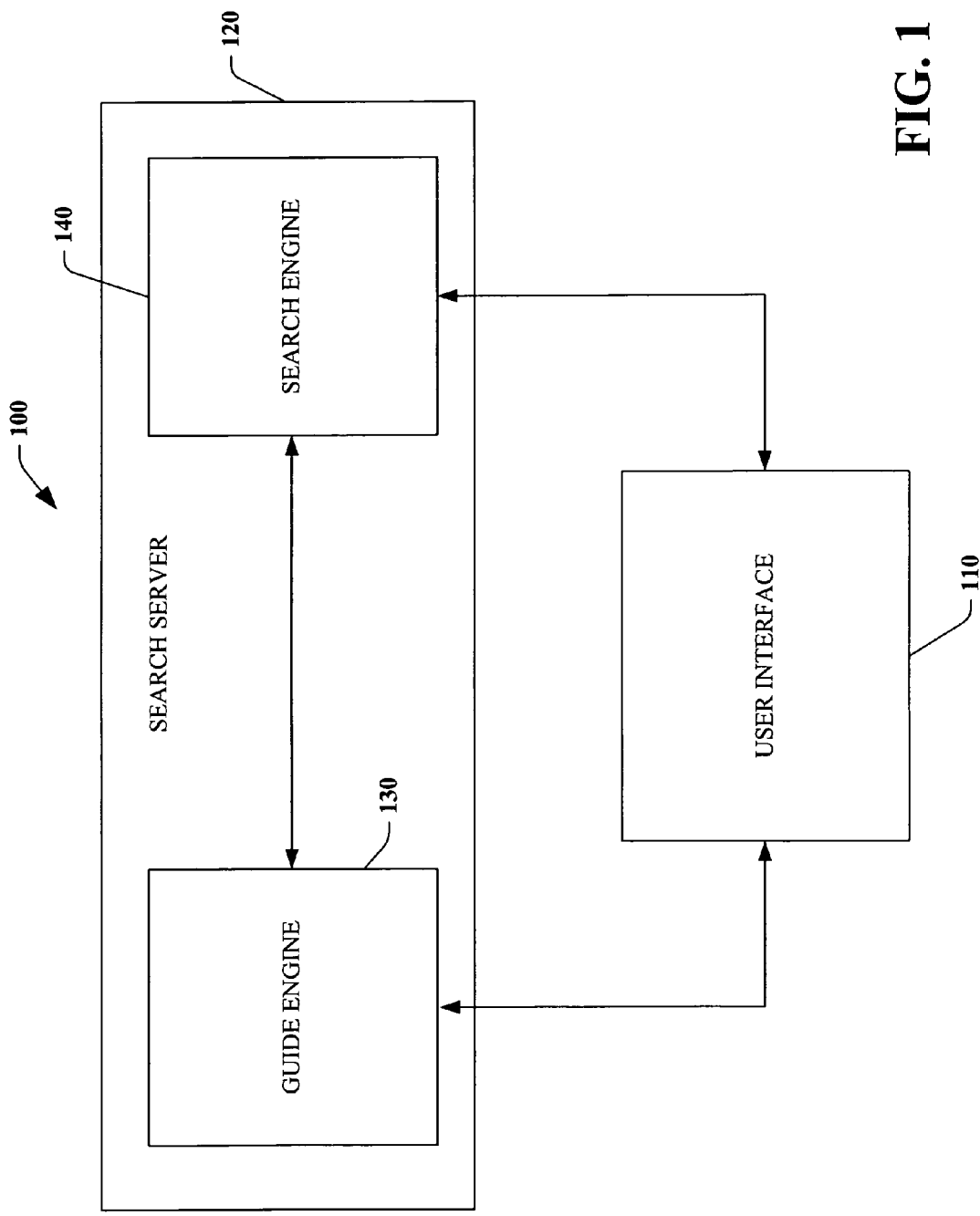
FIG. 1 is a system block diagram of a dynamic search system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description.

Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

FIG. 1 is a system block diagram of a dynamic search system 100. The dynamic search system 100 includes a user interface 110 that provides access to the system for a human user. The user interface 110 can be implemented as a command-line interface ("CLI"), a graphical user interface ("GUI"), a text-based interface, or may combine aspects of any of the foregoing interfaces in addition to other appropriate aspects. For example, a GUI may include aspects or elements such as graphical on-screen buttons, menus, including drop-down menus, text boxes, radio buttons, check boxes, or other appropriate elements. Use of such elements allows for an implementer of the disclosed system to choose elements that are appropriate for a specific implementation. Preferably, the user interface 110 is interactive and provides responsive information to the user as the user types.

The dynamic search system 100 also includes a search server 120. The search server 120 can perform phrase suggestion tasks and search tasks. In this example, as well as others, a phrase can include any datum that can be entered by a user and specifically includes complete words, groups of words, characters (including a single character or symbol), wildcard characters or symbols, prefixes, infixes, suffixes, and the like. When a component such as the search server 120 performs a suggestion task or provides a suggestion, the suggestion can include phrase completions, spelling corrections, additions to prefixes, infixes, or suffixes, substitutions for wildcard characters whether or not such substitutions include the same or a similar number of characters as those wildcard characters included in an original phrase, or even wholesale substitutions of phrases.

It should be understood that a type of data that can be used as a phrase can vary according to specific features of the user interface that is provided. For example, if the user interface is responsive to speech input, the phrase can include audio input of words, letters, or other types of phrases such as those disclosed and described above. If the user interface is responsive to handwritten input, the phrase can include any datum that can be recognized by that user interface and specifically can include any symbol that can be input.

The search server 120 includes both a guide engine 130 and a search engine 140. The guide engine 130 communicates with the user interface 110 to accept information from and transmit information to the user interface 110. The search engine 140 also communicates with the user interface 110 to accept information from the user interface 110 and transmit information back. The information transmitted from the search engine 140 to the user interface 110 is typically in the form of search results.

In accordance with this specific example, the information transmitted from the user interface 110 to the guide engine 130 is in the form of one or more phrases. One example of a phrase is a single character that is typed on a keyboard by the user. Alternatively, a phrase including a group of typed characters can be sent. The guide engine 130 can then use the phrase as a basis to generate suggestions. Specifically, the phrase can be used as a prefix for suggestions that begin with the phrase, as a suffix for suggestions that end with the phrase, as a root in the sense that suggestions can contain some form of the phrase, or simply as a basis upon which suggestions with related terms may be provided.

Figure 2:
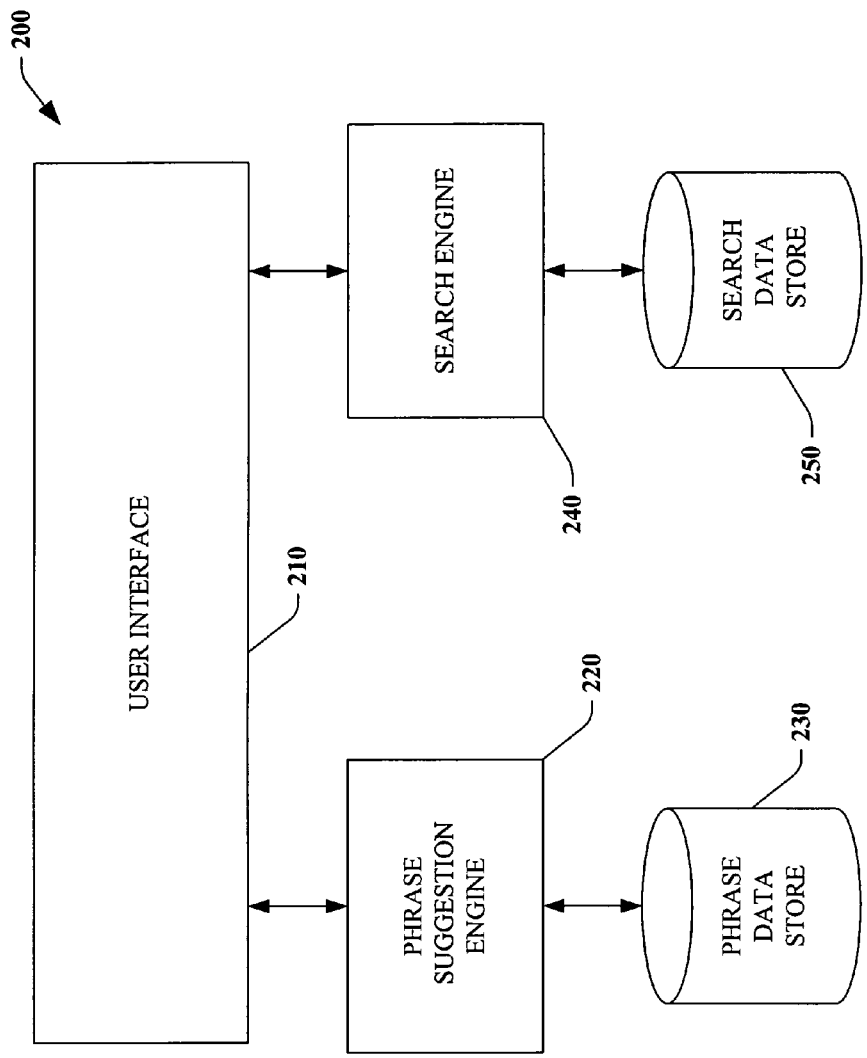
FIG. 2 is a system block diagram of a dynamic search client.

FIG. 2 is a system block diagram of a dynamic search client 200. The dynamic search client 200 includes a user interface 210. The user interface 210 can be a command-line interface, a graphical user interface, a text-based interface, or another type of interface that may or may not include one or more features of these types of interfaces. A specific example of a suitable interface is an interface that is based upon a web browser. Another possible interface is a Braille interface that conveys information that the user can receive through touching the interface. As previously described in conjunction with FIG. 1, the user interface 210 can be adapted in a wide variety of ways specific to a desired implementation.

Figure 16:
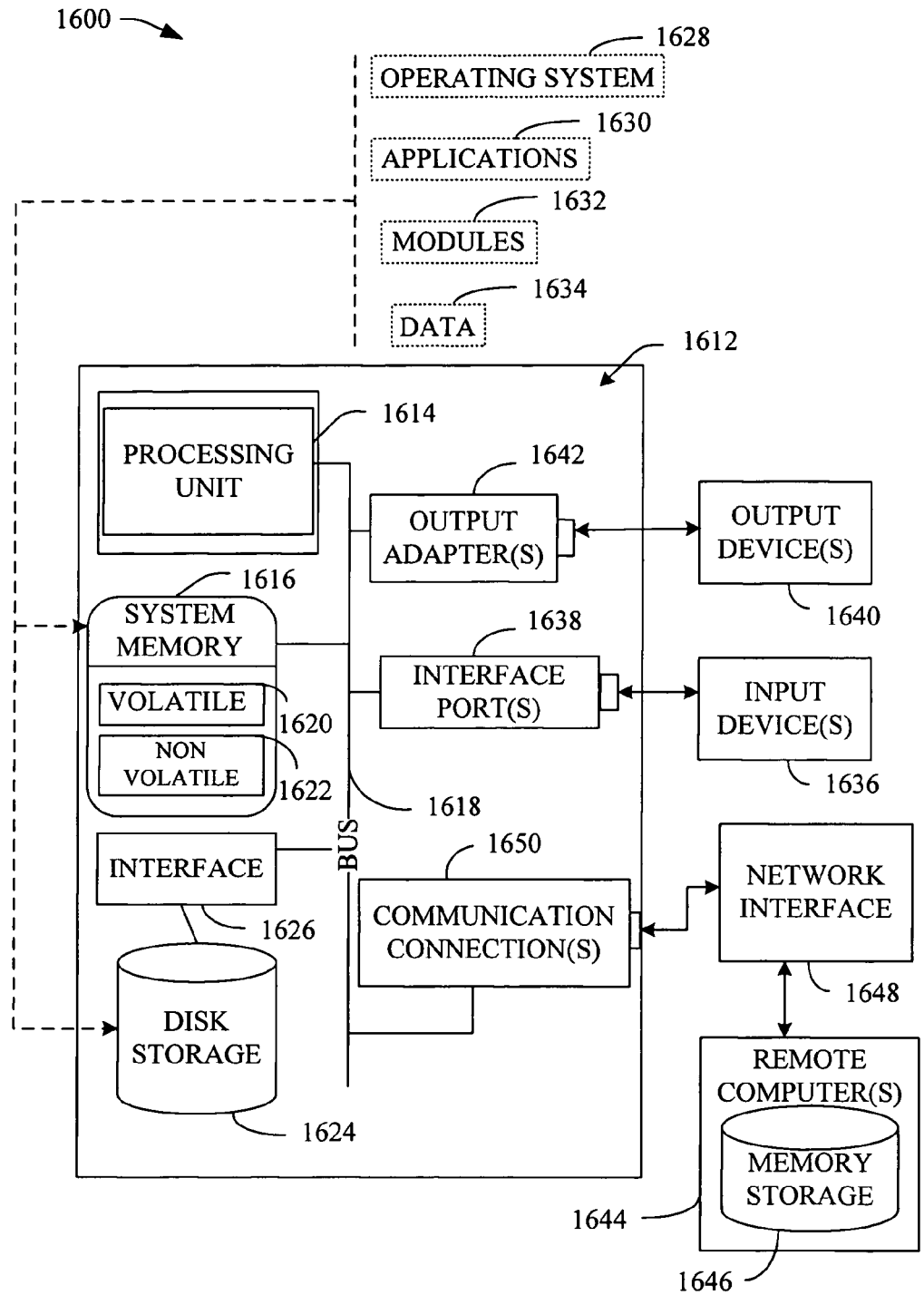
FIG. 16 is a schematic block diagram of an exemplary computer.

As will be appreciated from this disclosure and detailed description, various implementations of the components and methods disclosed and described herein can be constructed or performed on a wide variety of general-purpose computing devices, such as the computer of FIG. 16. Additionally or alternatively, other computing devices, including but not limited to special-purpose computing devices such as data entry terminals, among others, and mobile computing devices, such as wireless telephones, mobile computers, personal digital assistants (PDAs), personal information managers (PIMs), and the like, can also be used as platforms upon which a specific implementation can be built or used.

The disclosed and described components and methods can be of particular use in conjunction with mobile devices or other devices or scenarios when a user is unable to quickly enter data, such as when a user is entering text on a cellular telephone number pad or on an abbreviated keyboard, or using a stylus to select letters presented on a display screen, among others. Further, disclosed and described components and methods can be useful in noisy data entry environments such as when entering data by handwriting using a stylus or specially adapted pen input device such as a pen that tracks its position as it is moved across a surface having a specially designed surface pattern or some other mechanism to track position of the pen, or when using a speech recognition system, among others. In these and other environments, the disclosed and described components and methods can be used to assist data entry tasks and potentially overcome data entry errors, for example, in the misrecognition of a spoken word entry, among others, by suggesting phrases.

The dynamic search client 200 also includes a phrase suggestion engine 220. In this context, and in other places herein where required or appropriate and as described above, a phrase can include not only a plurality of words but also a single word, a portion or portions of one or more words, and even a single character, among other things. The phrase suggestion engine 220 can interact with the user interface 210 in order to assist in suggesting phrases to substitute for that which a user is entering.

With reference to phrase suggestion tasks, the phrase suggestion engine 220 can suggest a phrase to substitute in place of the phrase that is being entered or has been entered by the user. For example, if a user enters "aut," the phrase suggestion engine 220 can suggest the term "automobile." Similarly, in a speech-based interface, if a user says "auto," the phrase suggestion engine 220 can suggest "automobile." In another example, if a user enters the term "cars," the phrase suggestion engine 220 can suggest "sports cars dealers in Seattle, Wash."

Additionally or alternatively, the phrase suggestion engine 220 can suggest a query based upon a pattern that can include wildcards. For instance, if the user enters a phrase such as "Leo* DaVinci" the phrase suggestion engine 220 can suggest "Leonardo DaVinci." If a user speaks "DaVinci" but a voice recognition component identifies the input as "Davis," the phrase suggestion engine 220 can suggest queries that include sound-alike phrases such as "DaVinci." Other forms or types of suggestions are possible and will become apparent to those of ordinary skill in the art upon reading this disclosure. Such other forms or types include, but are not limited to, spelling correction, noisy input correction, and grammar correction.

To perform such suggestion tasks, the phrase suggestion engine 220 can access a phrase data store 230. The phrase data store 230 can be a simple list of common search terms, dictionary words, or phrases, can be such a list combined with probabilistic or other weighted measures, or can be another suitable set of phrases that can be used to suggest a substitute for a phrase entered by a user at the user interface 210. The phrase suggestion engine 220 can use a portion of a phrase entered by a user at the user interface 210 as a root or some other basis to suggest, predict, infer, or otherwise determine a likely phrase that the user is entering.

A search engine 240 can also interact with the user interface 210 of the dynamic search client 200. The search engine 240 can be located on a remote server, such as in the case of many of the search engines used to find content on the World Wide Web. The search engine 240 can also be a component that is located on a local machine, such as with a desktop search component. A search data store 250 can contain information that can be accessed and searched by the search engine 240. The search data store 250 can be a file, a group of files, a database, or any other appropriate data store that can contain information to be searched.

An example of the functioning the dynamic search client 200 follows. In operation, a user can enter a phrase at the user interface 210. Such entry can be by typing, speaking, gesturing, or any other data entry method that can be employed with the user interface 210. As each portion of the phrase is entered by the user, the user interface 210 sends such portion (or alternatively, an aggregated portion including portions already entered) to the phrase suggestion engine 220. The phrase suggestion engine 220 uses the phrase as a root or other basis to determine an appropriate phrase to suggest as a replacement or substitute for the entered phrase. This determination can be predictive based upon available dictionary words, past searches by the user or other users, or some other available means. The phrase suggestion engine 220 obtains appropriate phrases from the phrase data store 230. This procedure of obtaining a phrase to use as a root or other basis from information entered into the user interface 210 and suggesting a phrase based upon information from the phrase data store 230 can be incrementally repeated as phrases are constructed or completed and a new entry of a datum or data is begun by the user.

Upon completion of a query that includes one or more suggested phrases, the user interface 210 sends the query to the search engine 240. The search engine 240 uses the query to find information in the search data store 250 that is responsive to the query. Once such responsive information is found, or alternatively a failure to find responsive information is determined, the search engine 240 sends the responsive information or a failure message to the user interface 210. The user interface 210 then presents the response of an affirmation or failure message to the user. It should be noted that such searches performed by the search engine can also be performed incrementally as each individual phrase is suggested by the phrase suggestion engine 220. The user interface 210 can then provide dynamically updated search results based upon a continuously-evolving search query that is based at least in part upon suggestions. In at least this case, the search engine 240 can use previous result sets or perform additional computational or search tasks on the query to improve search performance as the user enters additional data.

Figure 3:
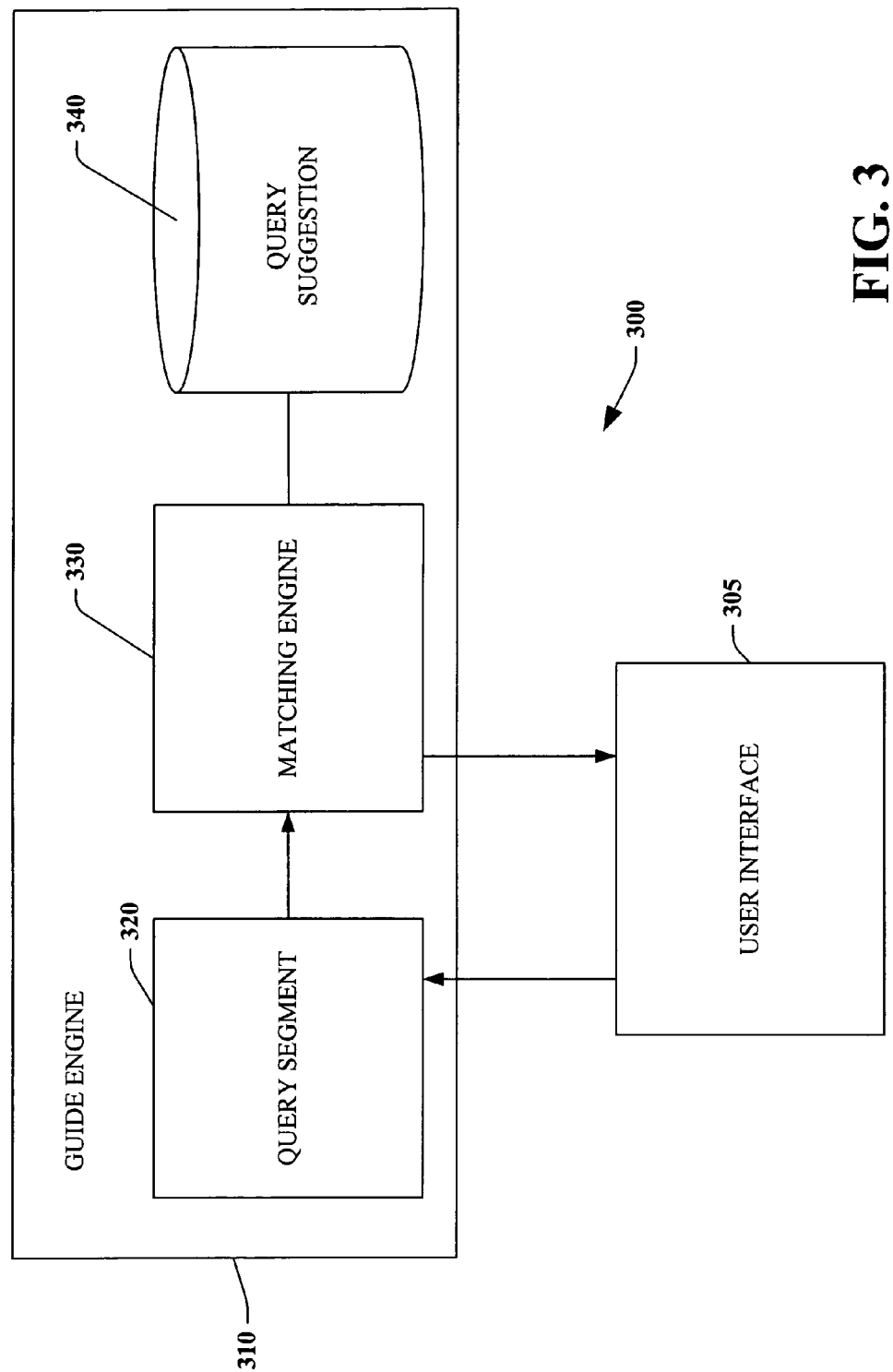
FIG. 3 is a system block diagram of a guide engine and user interface system.

FIG. 3 is a system block diagram of a guide engine and user interface system 300. A user interface 305 can transmit information to a guide engine 310. A query segment engine 320 can accept information from the user interface 305, such as a phrase, and create a query segment from that information. The created query segment is then sent to a matching engine 330. The matching engine 330 accesses information from a query suggestion data store 340 to match a query segment with a suggestion. A number of methods may be employed to perform the matching, including, but not limited to, a simple lookup of words that begin with a single character in an entered phrase, a probability-based suggestion using popular phrases from a group of users, or a customized suggestion based upon preferences and likely search topics from a specific user.

The query suggestion data store 340 can be implemented in a variety of ways. For example, the query suggestion data store 340 can be a flat dictionary file containing common search terms to be used as suggestions. Such a file may be combined with a probabilistic ranking so that terms appear in order of likelihood for search rather than alphabetically or using some other ordering method. The query suggestion data store 340 can also be implemented as a table or tables in a database, again, with or without probability information. Other appropriate data structures can be employed, depending upon the needs or desires of a specific implementer.

One example of a possible mode of operation of the guide engine and user interface system 300 follows. In operation, the user interface 305 accepts an entered phrase from a user. As the user types the phrase at a keyboard, portions of the phrase, such as single characters or groups of characters, are transmitted to the query segment engine 320 of the guide engine 310. The query segment engine 320 assembles the portions of the phrase it has received into a query segment. This query segment is used by the matching engine 330 as a basis for finding suggestions in the query suggestion data store 340. The query segment may be used as a prefix, a root, a suffix, or a basis for other, typically similar or related, terms. The matching engine selects one or more suggestions and transmits those suggestions to the user interface 305.

Figure 4:
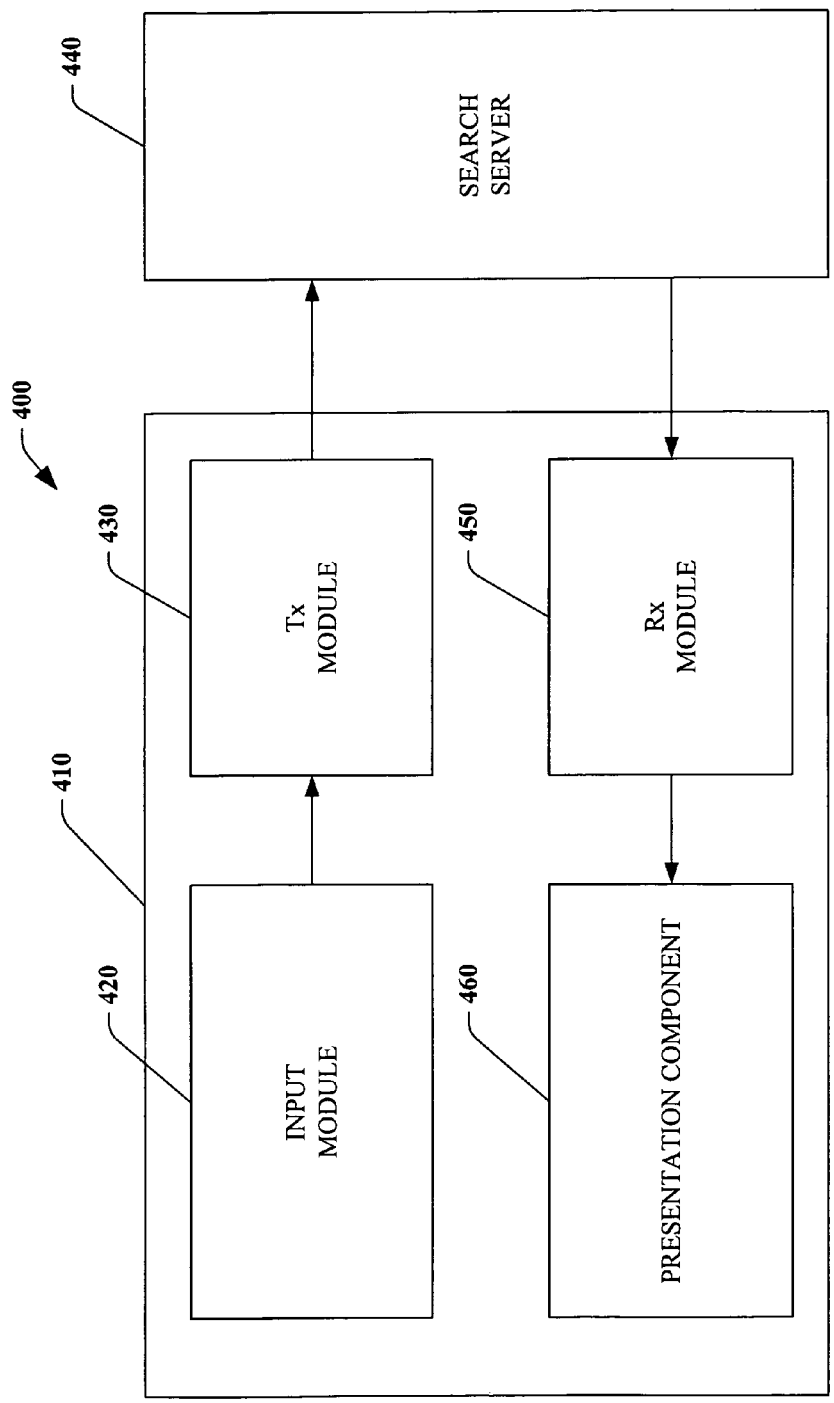
FIG. 4 is a system block diagram of a dynamic search user interface.

FIG. 4 is a system block diagram of a dynamic search user interface 400. A user interface 410 includes an input module 420 that accepts phrases input by a user. It should be recognized that a specific implementation of the input module 420 depends in part upon the type of user interface implemented. Typical components that can be used include text boxes, radio boxes, and check boxes, among others.

The user interface 410 also includes a transmitter module 430 that sends information, including suggestions, to a search server 440. The search server 440 performs certain actions relating to suggestions and transmits information to a receiver module 450 of the user interface 410. The receiver module 450 conveys received information to a presentation component 460 that conveys information to the user.

In an exemplary mode of operation of the dynamic search user interface 400, the user interface 410 is implemented as a hypertext markup language ("HTML") document that includes JavaScript, a Java Applet, or another suitable component. The document and associated component(s) are rendered or executed, as appropriate, within a typical web browser. The HTML document can include settings or search selections or preferences that are selectable through on-screen buttons or the like. Among the technologies that may be employed are web services, other scripting languages, other modules to replace Applets, and other types of data storage and retrieval systems.

A user can position a cursor within a text box associated with a search and begin typing on a keyboard. The input module 420 will then accept the characters typed by the user and send those characters to the transmitter module. The transmitter module 430, which may be implemented in JavaScript, as an Applet, or other suitable component, transmits the typed characters as a phrase or phrases to the search server 440.

Based upon the phrase or phrases submitted and other factors such as whether the phrase or phrases is or are to be treated as a prefix, a suffix, or otherwise, the search server will identify at least one suggestion. It should be noted that a default category such as "nothing found" can be implemented as a catch-all or default suggestion. The search server 440 then transmits information including a suggestion to the receiver module 450. The receiver module 450 then conveys the received suggestion to the presentation component 460. The presentation component can cause the user interface 410 to display a list of suggestions to the user. Alternatively or additionally, the presentation component can cause a set of preliminary search results based at least upon one or more suggestions to be displayed to the user. The user can then select or accept a suggestion or can continue to create a phrase. If the user continues to create a phrase, a new suggestion can then be created and sent again to the search server 440 for the identification of new suggestions.

Figure 5:
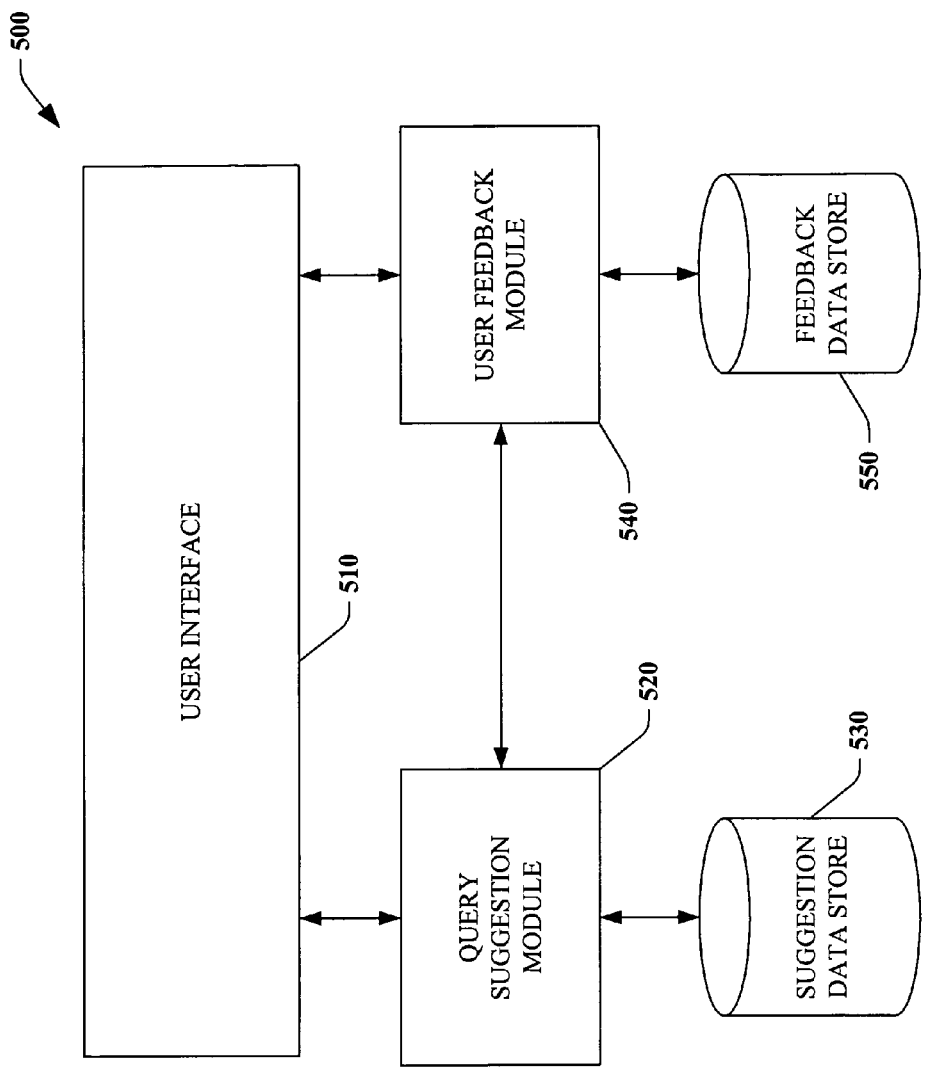
FIG. 5 is system block diagram of a dynamic search client that also includes user feedback functions.

FIG. 5 is system block diagram of a dynamic search client 500 that also includes user feedback functions. The dynamic search client 500 includes a user interface 510. The user interface 510 can be a text-based interface, a graphical user interface, a command line interface, or any other suitable interface, specifically including any of the interfaces previously discussed in conjunction with other figures. The user interface 510 specifically can accept data entered by user and can present data, such as results of search queries, back to the user in a human-readable form. Additionally, the user interface 510 can cooperate with other components to provide an interactive search environment to the user.

A query suggestion module 520 can communicate with the user interface 510 to obtain portions of a phrase entered by a user. Such portions can be individual letters that are included in the phrase being built by a user, can be portions of words, or can be groups of words to be included as search terms for query, among other things as described above with reference to other figures. The query suggestion module 520 can access information from a suggestion data store 530 in order to determine an appropriate manner in which to suggest a query to substitute for a query being entered as a phrase by a user at the user interface 510. The query suggestion module 520 can also access information from a user feedback module 540 in order to adjust a manner in which the query would otherwise be completed. The user feedback module 540 can provide information from a feedback data store 550 and assist the query suggestion module 520 in suggesting a partial query for the user in such a way that is more likely to result in the obtaining of responsive information than could be achieved without the use of such feedback information.

Information in the feedback data store 550 can be compiled from analysis of a user's interaction with the results of search queries over time. For example, if responsive information is presented to the user as a series of hyperlinks, individual hyperlinks within the series can be ranked and a user's interaction with each hyperlinked result, such as by clicking, can be tracked and used to measure quality of the query that provided the results. A click by a user on a highly-ranked result can be taken as an indication that the suggested query was highly effective at locating information that the user deems to be responsive to his inquiry. Additionally or alternatively, a user's click on a low-ranked result can be taken as an indication that the suggested query was of poor quality and needs to be improved.

Feedback from a user can also be used immediately to improve search results, phrase suggestions, or both. For example, the user interface 510 can include a component that the user can select to indicate that none of the suggestions presented is desired. Such a selection by the user can be employed to cause the query suggestion engine 520 to aggressively look for spelling corrections, grammatical suggestions, or for uses of entered phrases in other subject domains. For example, if the user enters "Saturn," a first set of suggestions presented to the user can have a common theme of astronomy-related results. When the user indicates that such suggestions are not appropriate for his specific query, the query completion engine 520 can provide new suggestions in the domain of mythology. Additionally or alternatively, the user can manipulate a control of the user interface 510, such as a slider, to indicate relative numbers of corrections, as opposed to suggestions, are desired.

The user feedback module 540 or the feedback data store 550, or both, can be implemented as server on a remote computer. In such an exemplary implementation, the user feedback module 540 can take into account searches and search queries from a large number of users. Similarly, the query suggestion module 520 and the query data store 530 can also be implemented on a remote computer to obtain similar benefits from information gathered from a large number of users. By leveraging larger amounts of information from a wide variety of users, query suggestion tasks can be further refined to take into account such things as context and most likely desired results.

For example, depending upon certain real-life events, probabilities can be assigned to various search terms in order to attempt to maximize all likelihood that a user obtains responsive information to his query. For instance, a user who enters "sta" at one point in time, such as upon an opening weekend of a popular movie release, can have that query completed as "star maps," but at a second point in time can have that same root completed as "collecting stamps."

One possible mode of operation of the dynamic search client 500 follows. The user interface 510 accepts a portion of a query from a user. As the user enters each portion of the query, the user interface 510 can send each portion to the query suggestion module 520. The query suggestion module 520 accesses information from the feedback data store 550 that is provided by the user feedback module 540 and, using that information, selects an appropriate suggestion from the query data store 530. The query suggestion module 520 presents the selected query suggestion to the user through the user interface 510.

Figure 6:
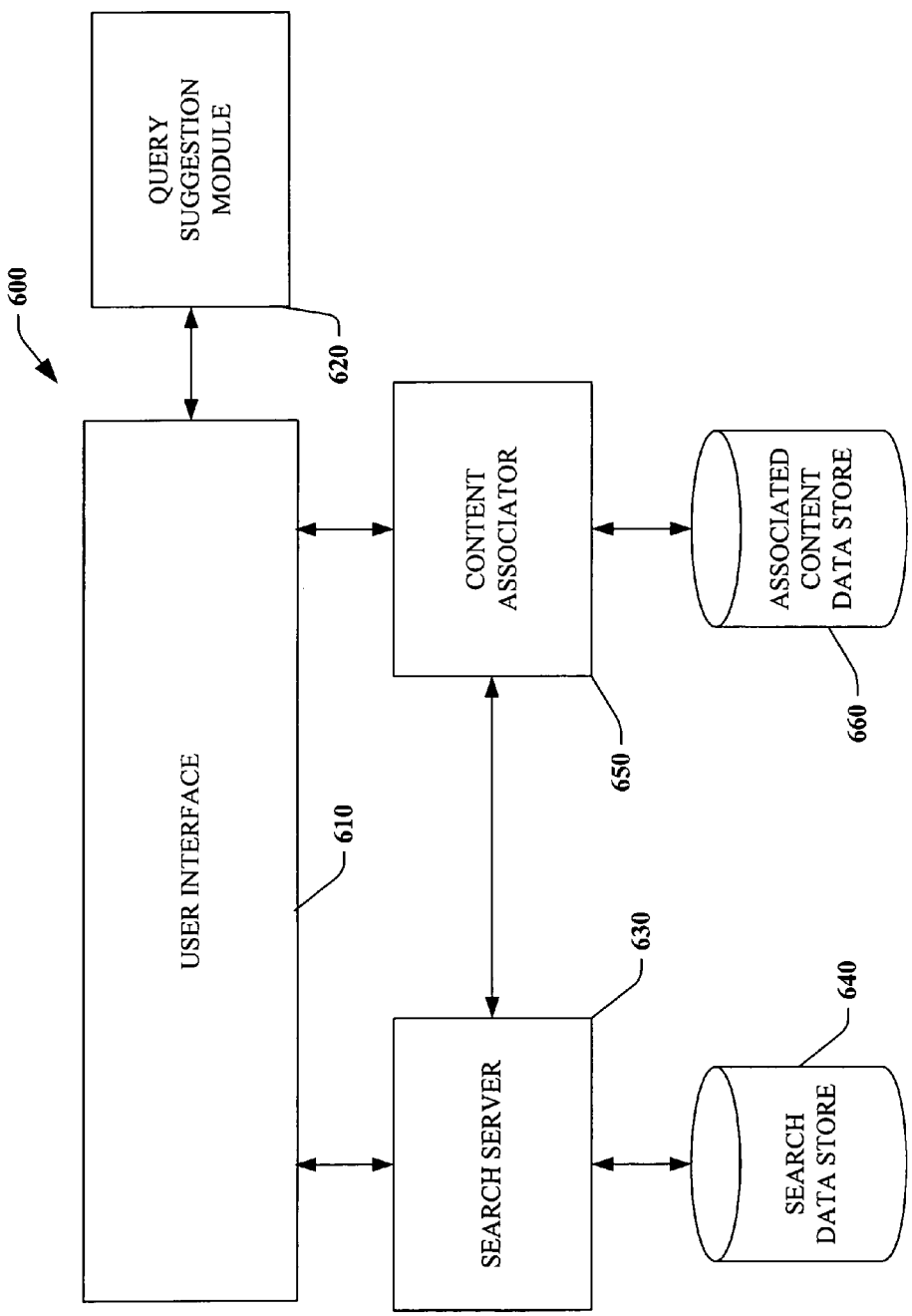
FIG. 6 is a system block diagram of a dynamic search client that also includes content association functions.

FIG. 6 is a system block diagram of a dynamic search client 600 that also includes content association functions. The dynamic search client 600 includes a user interface 610. The user interface 610 to be a text-based interface, a graphical user interface, a command line interface, or any other suitable interface, specifically including any of the interfaces previously discussed in conjunction with other figures. The user interface 610 specifically can accept data entered by a user and can present data, such as results of search queries, back to the user in a human-readable form. Additionally, the user interface 610 can cooperate with other components to provide an interactive search environment to the user.

A query suggestion module 620 can provide suggestions for queries that have been entered, at least in part, by a user through the user interface 610. The user interface 610 can provide a suggested query to a search server 630. The search server 630 can use the suggested query as part of a search of information contained in a search data store 640. The search data store 640 can be any suitable data store such as an index of websites or a database, among others.

The search server 630 can also access information from a content associator 650. The content associator 650 can use the suggested query submitted from the user interface 610, results of a search of the search data store 640, or both, to locate content from an associated content data store 660 to associate with results of the search for presentation to user. As with other data stores, the associated content data store 660 can be a database, can be a file, can be a group of files, or can be any suitable means of storing information for retrieval in accordance with the specific implementation. The content associator 650 can associate content, such as advertising, with results of the search performed by the search server 630. The search server 630 can then provide information that is responsive to the query along with associated content to the user interface 610 for presentation to the user.

A possible manner of operating the dynamic search client 600 follows. The user interface 610 accepts a phrase entered by a user. The phrase is sent to the query suggestion module 620 so that the query suggestion module 620 can suggest a possible query. The possible query suggestion can be a simple word suggestion or phrase suggestion, or a more complex suggestion, such as those types of suggestions previously described in conjunction with other figures. The user interface 610 then sends the suggested search query to the search server 630. This search server 630 uses the suggested query to obtain responsive information from the search data store 640.

The content associator 650 accesses the responsive information obtained by the search server 630 and analyzes that responsive information to form a second query. The second query is used by the content associator 650 to obtain content from the associated content data store 660. In this specific example, information in the associated content data store 660 includes advertising. Content obtained from the associated content data store 660 that is responsive to the second query is provided to the search server 630. The search server 630 sends both the responsive information and the associated contents to the user interface 610 for presentation to the user. In this manner, advertising can be targeted to individuals who are most likely to be responsive to such advertising because the advertising content from the associated content data store 660 is specifically associated with information that is responsive to a query performed by the user.

Figure 7:
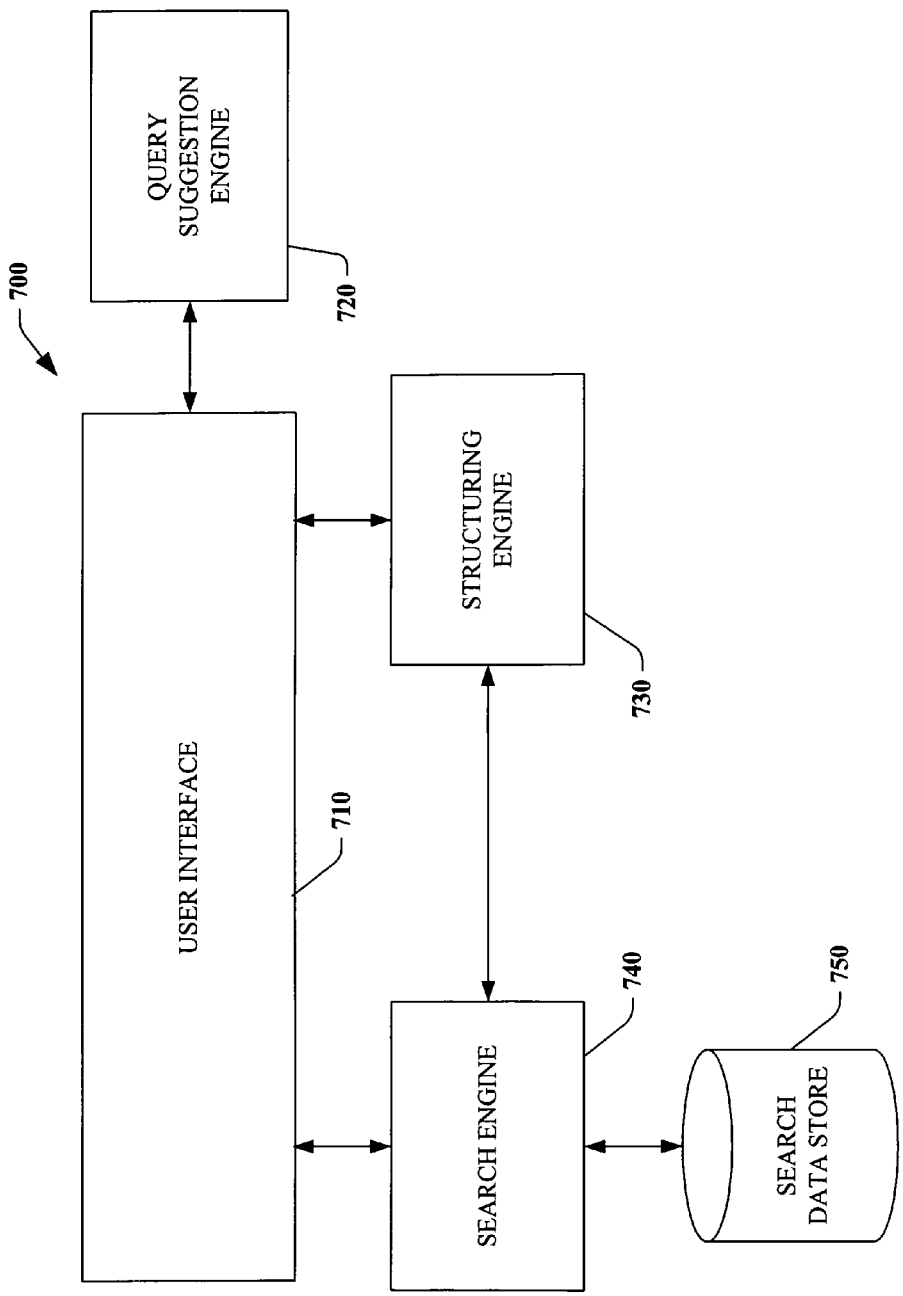
FIG. 7 is a system block diagram of a dynamic search client system that includes structuring functions.

FIG. 7 is a system block diagram of a dynamic search client system 700 that includes structuring functions. The dynamic search client system 700, as shown in this specific example, is specifically adapted for data retrieval tasks that include or support an ability to use structured queries, such as queries composed in the Structured Query Language (SQL) or another structured language. Such a client search system can provide a relatively informal or natural language interface for a system that requires data queries to be input in a highly formal manner that may require highly specialized training to master.

The dynamic search client system 700 includes a user interface 710. The user interface 710 can be a text-based interface, a graphical user interface, a command line interface, or any other suitable interface, specifically including any of the interfaces previously discussed in conjunction with other figures. The user interface 710 specifically can accept data entered by the user and can present data, such as results of search queries, back to the user in a human-readable form. Additionally, the user interface 710 can cooperate with other components to provide an interactive search environment to the user.

The user interface 710 can communicate with a query suggestion engine 720. Specifically, the user interface 710 can provide a phrase to the query completion engine 720. The query suggestion engine 720 can, based upon a variety of factors such as factors or methods previously discussed in conjunction with other figures, suggest a substitute phrase for the phrase entered at the user interface 710 to be used as a search query. In this specific example, the suggested phrase can include a group of key words or a natural language query in sentence form, among others. The query suggestion engine 720 can then send a suggested query to a structuring engine 730. The structuring engine 730 can use the suggested query from the query suggestion engine 720 to create a structured query that can be used by a search engine 740. For instance, the natural language query sent by the query suggestion engine 720 can be transformed into an SQL statement. The SQL statement can be sent by the structuring engine 730 to the search engine 740. The search engine 740 can use the SQL statement to identify and obtain responsive information from a search data store 750. The search engine 740 sends the responsive information from the search data store 750 to the user interface 710 for presentation to the user.

Figure 8:
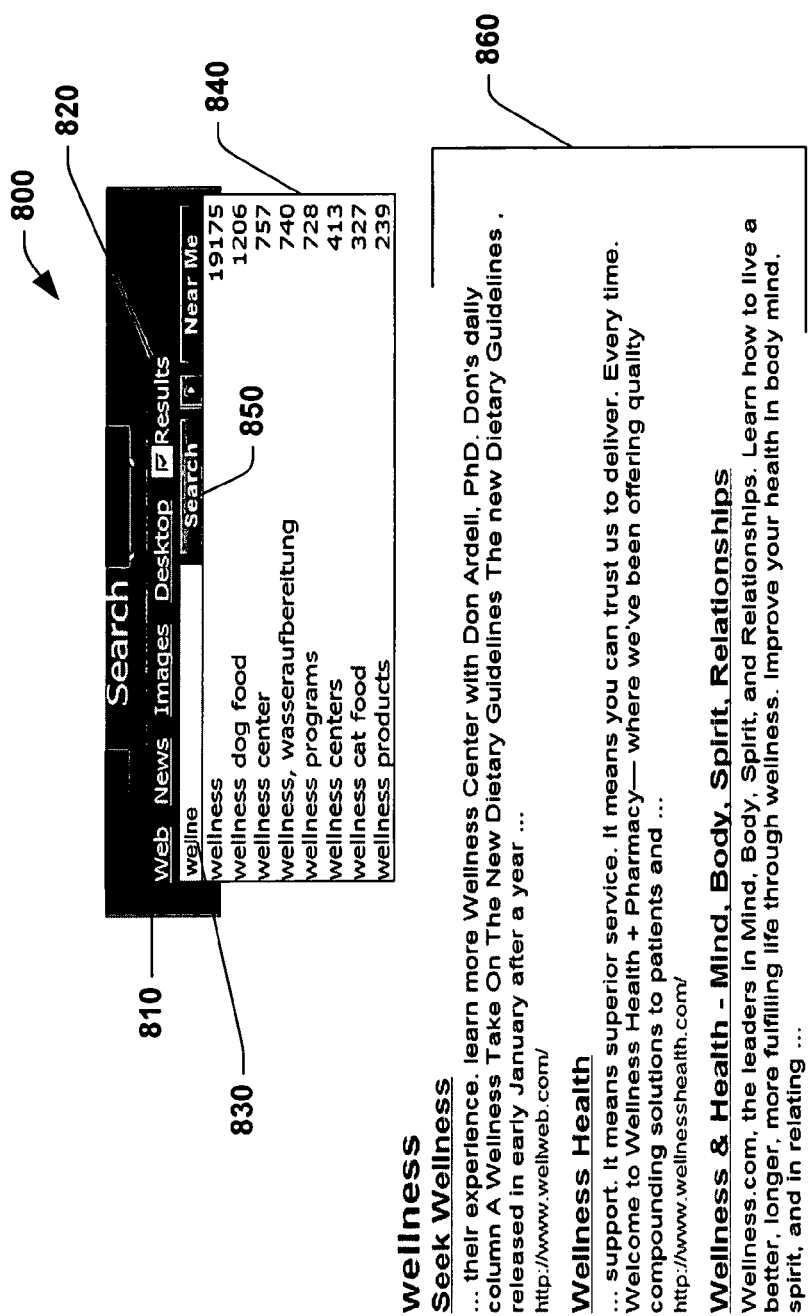
FIG. 8 is a diagram of a user interface.

FIG. 8 is a diagram of a user interface 800 that can be employed with various disclosed and described components of a dynamic search client. The user interface 800 includes a group of function selection links 810 that allow a user to designate a field for a search. Specifically depicted fields include the World Wide Web, News sites, Images, and the user's Desktop, which typically includes files on the user's machine whether that machine is a desktop PC. Laptop computer, or other machine, or whether those files are located on a logical desktop of a GUI or at some other location in a file system. A Results check box 820 allows the user to select whether results of partial searches are to be shown.

A text entry box 830 allows a user to enter a phrase. As shown, a phrase has been entered. Suggestions, along with a number of possible hits or results for a search on that suggestion, are listed in a drop-down text field 840. These suggestions can be selected by the user for use as a complete query by selecting a desired entry with a mouse and then clicking on the Search button 850 in order to submit the suggestion as a query for a search.

As the user enters a phrase, results are displayed in a results area 860. In this example, the results are based upon a preliminary search, which can be cached, using the topmost suggestion. As a user continues to type, the list of suggestions can change as the user provides a more complete phrase. Therefore, results of a preliminary search can change as well. The user can submit a suggestion as a query at any time by clicking on the Search button 850. Similarly, the user can terminate the creation of a suggested query by navigating directly to one of the preliminary search results displayed in the results area 860.

It should be appreciated that other complex data can be presented to the user instead of, or in addition to, preliminary search results. Such presentations can be in the form of sponsored links to advertisers' web sites, online services, multimedia previews, or another appropriate information presentation. Additionally, such corrective functions as spell checking and alternative spelling or terms can be presented.

Those of ordinary skill in the art should also recognize that other information may be combined with user-entered phrase to further refine search results. For example, all of the user's activities at the computer can be monitored or logged. That monitored or logged information can then be used as part of the system to tailor search results, to pre-load results based upon the suggestion used as a prefix, or to otherwise optimize search parameters. Also notable is that servers can coordinate information in a variety of ways. The search server itself can include a group of individual servers or can simply be a component on the user's own machine. Servers can communicate with each other directly instead of, or in addition to, communicating with the user interface or other client component. Intermediate systems can also be employed to make processing more efficient or for other concerns such as security. Of course, separate servers can be used for guide and search functions.

With reference to FIGS. 9-14, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 9:
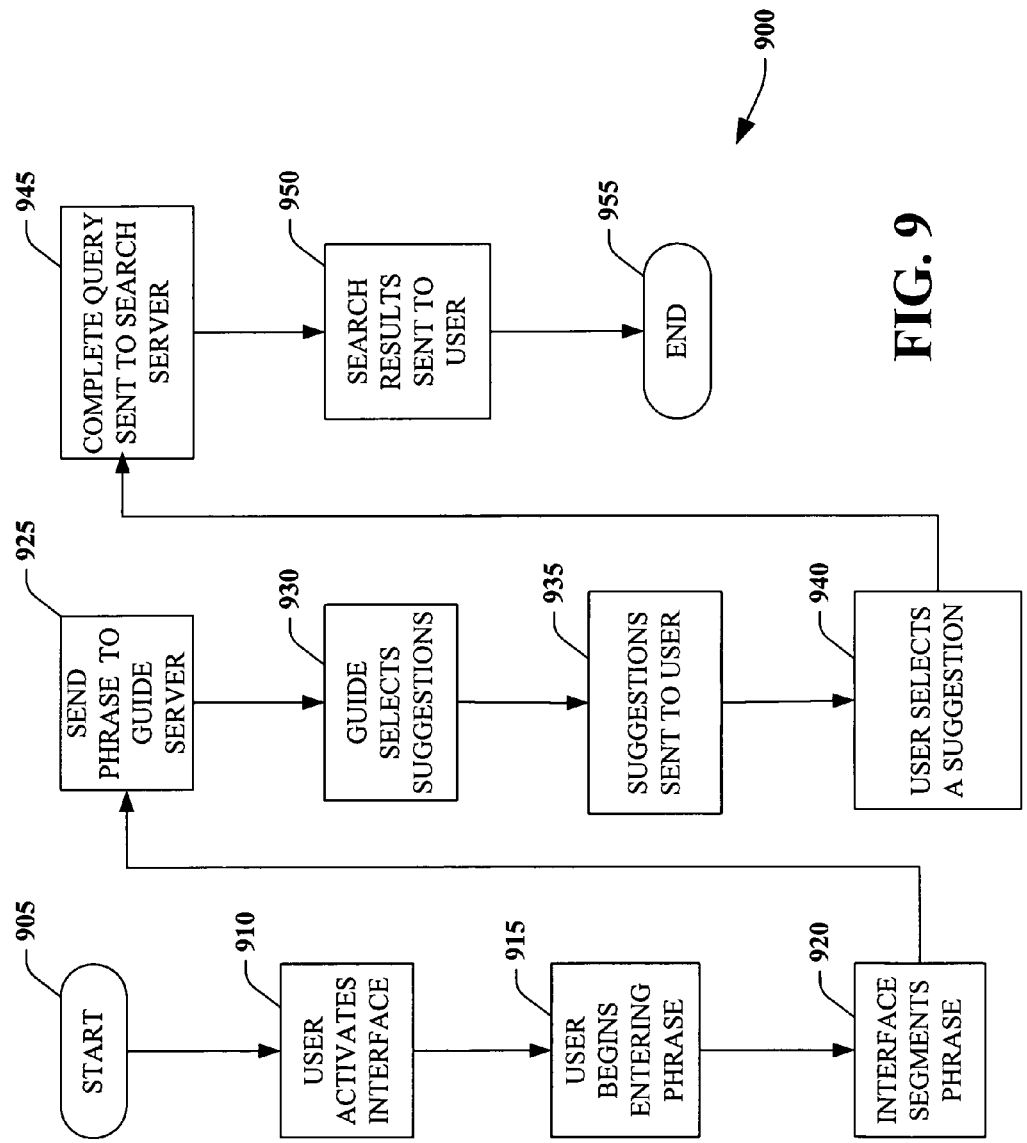
FIG. 9 is a flow diagram showing processing of a method that can be used in conjunction with components disclosed or described herein.

FIG. 9 is a flow diagram showing processing of a method 900 that can be used. Processing begins at START block 905 and proceeds to process block 910 where a user activates a search interface. At process block 915 the user begins to enter a phrase. The user interface segments the phrase at process block 920 and sends a segment to a guide engine at process block 925. The guide engine selects suggestions at process block 930. At process block 935, the suggestions are sent to the user.

The user, at process block 940, selects a suggestion from among the suggestions sent. Upon selecting a suggestion, a complete query is formed from the suggestion and sent to a search server at process block 945. The search server then generates a set of search results and transmits those results back to the user at process block 950. Processing terminates at END block 955.

Figure 10:
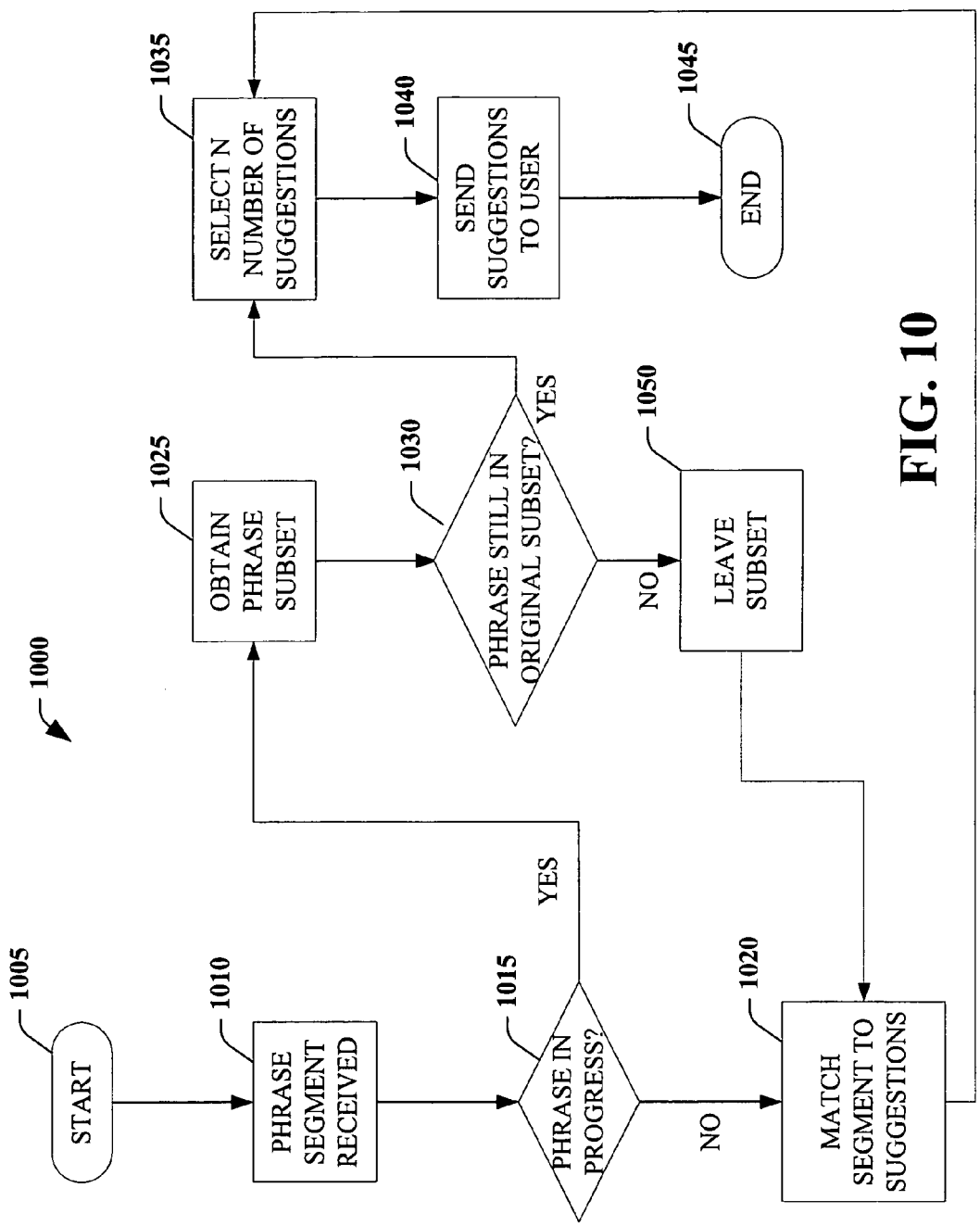
FIG. 10 is a flow diagram showing processing of a method that can be used in conjunction with components disclosed or described herein.

FIG. 10 is a flow diagram showing processing of a method 1000 that can be used in accordance with certain disclosed components. Processing begins at START block 1005 and proceeds to process block 1010 where a phrase is received. At decision block 1015, a determination is made whether construction of a phrase is already in progress. If no, the phrase is matched with suggestions at process block 1020. If yes, processing continues at process block 1025 where a suggestion subset is obtained to narrow the set of possible suggestions based upon earlier phrase information. Processing proceeds to decision block 1030 where a determination is made whether it is likely that the phrase being created by the user is still within an initial subset of completions. This determination allows for the fact that additional phrase information provided by the user can result in a change of the field of a query that can be based upon a suggestion. For example, a user who enters "bruin" as a phrase can initially be presented with completions that relate to species of bears. However, a more complete phrase such as "bruins hockey" can make it evident that the user desires information not about bears but about the sport of ice hockey.

If the determination made at decision block 1030 is yes, processing continues to process block 1035 where some number, N, of suggestions is selected. At process block 1040, those suggestions are sent to the user. Processing then terminates at END block 1045. If the determination at decision block 1030 is no, processing continues to process block 1050 where the initial suggestion subset is left. Processing then continues at process block 1020.

Figure 11:
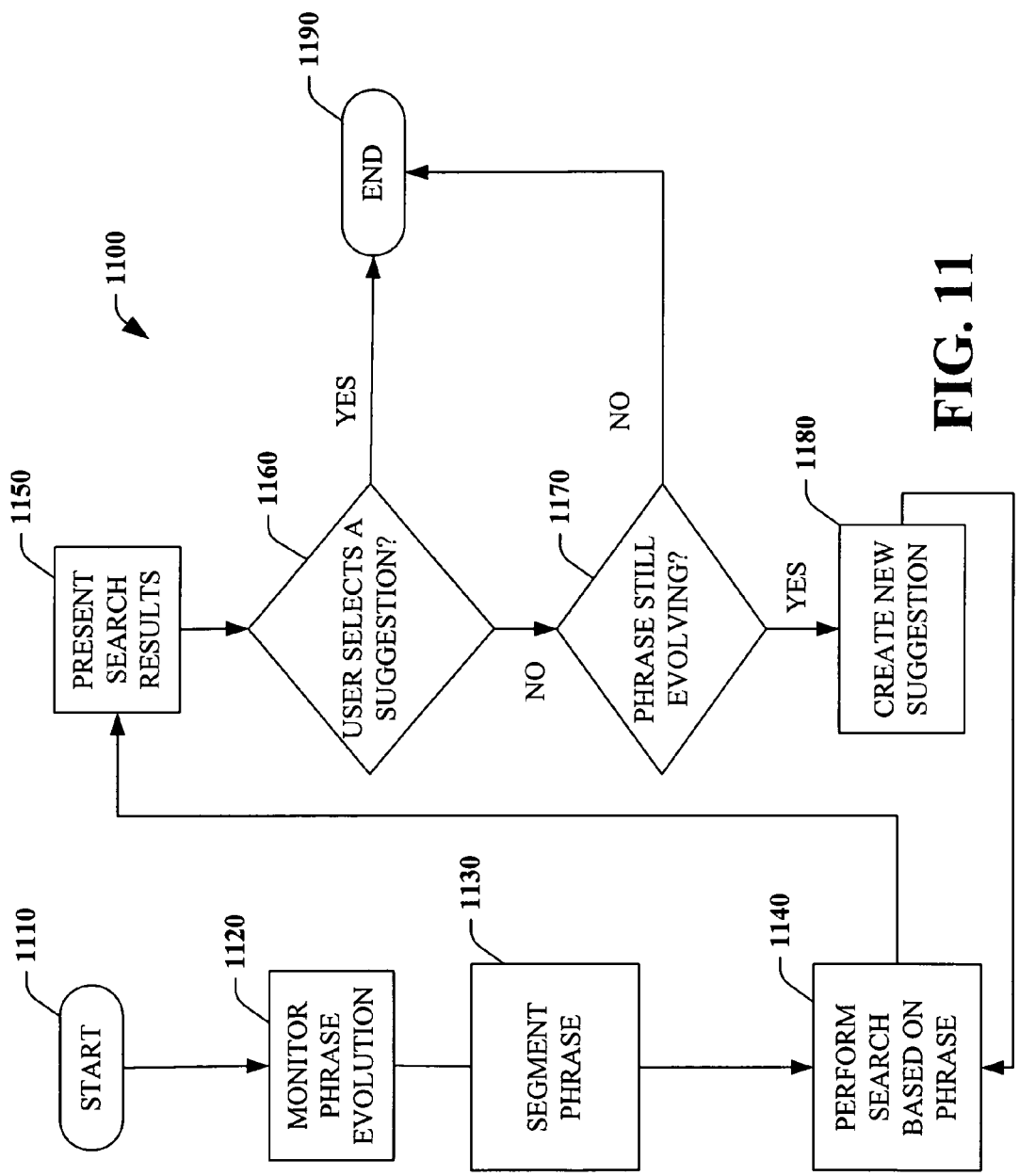
FIG. 11 is a flow diagram showing processing of a method that can be used in conjunction with components disclosed or described herein.

FIG. 11 is a flow diagram depicting acts in a method 1100. Processing begins at START block 1110 and proceeds to process block 1120 where evolution of a phrase is monitored. At process block 1130, the phrase is segmented and a search based on that segment is performed at process block 1140. Results of that search are presented at process block 1150.

At decision block 1160, a determination is made whether the user has selected a result from among the results presented at process block 1150. If no, processing continues to decision block 1170 where a determination is made whether the phrase entered by the user is still evolving. If yes, processing continues to process block 1180 where a new segment is created.

Processing then continues to process block 1140 where a search based upon the new segment is performed. If the determination made at decision block 1160 is yes, processing terminates at END block 1190. Similarly, if the determination made at decision block 1170 is no, processing also terminates at END block 1190.

Figure 12:
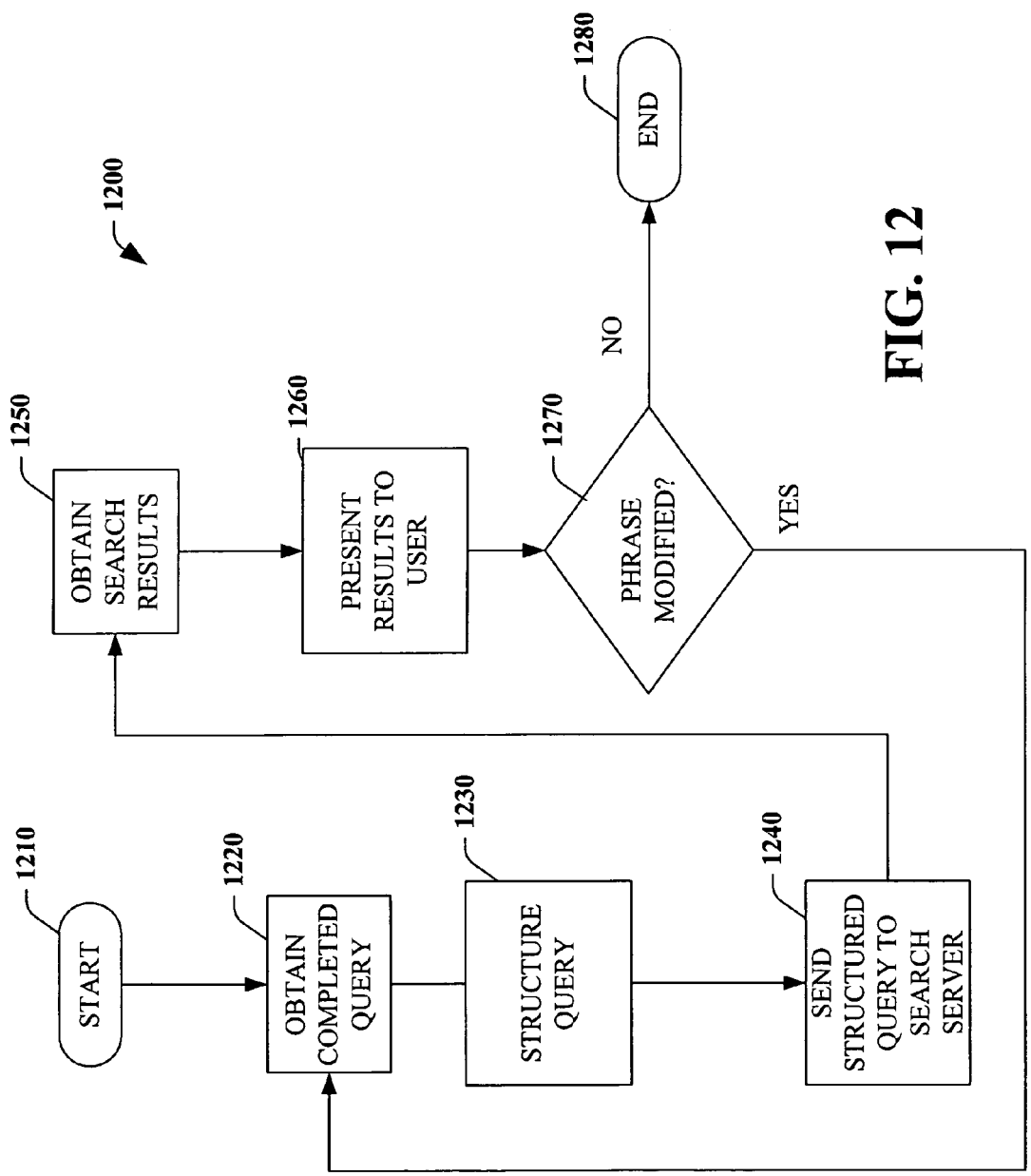
FIG. 12 is a flow diagram showing processing of a method that can be used in conjunction with components disclosed or described herein.

FIG. 12 is a flow diagram of a general processing flow of a method 1200 that can be used with the dynamic search client, such as one or more of the dynamic search clients that have been disclosed and described in conjunction with previous figures. Specifically, the general processing flow of the method 1200 can be used in conjunction with a dynamic search client that uses structured queries to obtain information for users. A dynamic search client used in such a capacity can provide an easy to use, natural, and intuitive interface to a data storage system that uses complex query forms and requires a large amount of specialized training to use.

Processing of the method 1200 begins at START block 1210 and continues to process block 1220. At process block 1220, a query suggestion is obtained. The query suggestion can be a query suggested by a query suggestion engine such as one of the query suggestion engines disclosed and described in conjunction with previous figures. Processing continues to process block 1230 where the suggested query is structured in accordance with particular requirements of an environment within which the method 1200 is being used. For example, if the processing environment includes a relational database, the suggested query can be converted into an SQL query using a variety of approaches, including the use of, definitions of, or assumptions about tables to be accessed or various aggregation functions to be performed, among others. It should be noted that particulars of structuring a query can and usually will vary greatly depending upon a specific implementation.

At process block 1240, the structured query is sent to a search server. The search server can access some store of data, such as a relational database, and use the structured query to locate information within that store of data that is responsive to the structured query. The responsive data is obtained and packaged as a set of results at process block 1250. The packaging of the set of results also can vary greatly in forming content depending upon a specific implementation. For example, results can be formatted as a set of documents that are represented by hyperlinks that can be clicked on by a user to access the specific results within the result set.

The results set, or least a portion thereof, is presented to a user at process block 1260. At decision block 1270, a determination is made whether the suggested query has been modified from its original form. Such modification can take place because of the operation of the dynamic search client that incrementally or continually refines or updates a phrase that is created or entered by a user. In such case, the modified suggested query can be structured and a search based thereon will likely generate a different result set.

If the determination made a decision block 1270 is yes, processing returns to process block 1220 where the newly-modified suggested query is obtained and thereafter structured at process block 1230. If the determination made at decision block 1270 is no, processing terminates at end block 1280. It should be appreciated that a query can be modified in this manner more than once. To conserve processing resources or for other reasons, a limit can be set that provides a maximum number of times that a particular query can be modified or otherwise refines an update algorithm.

Figure 13:
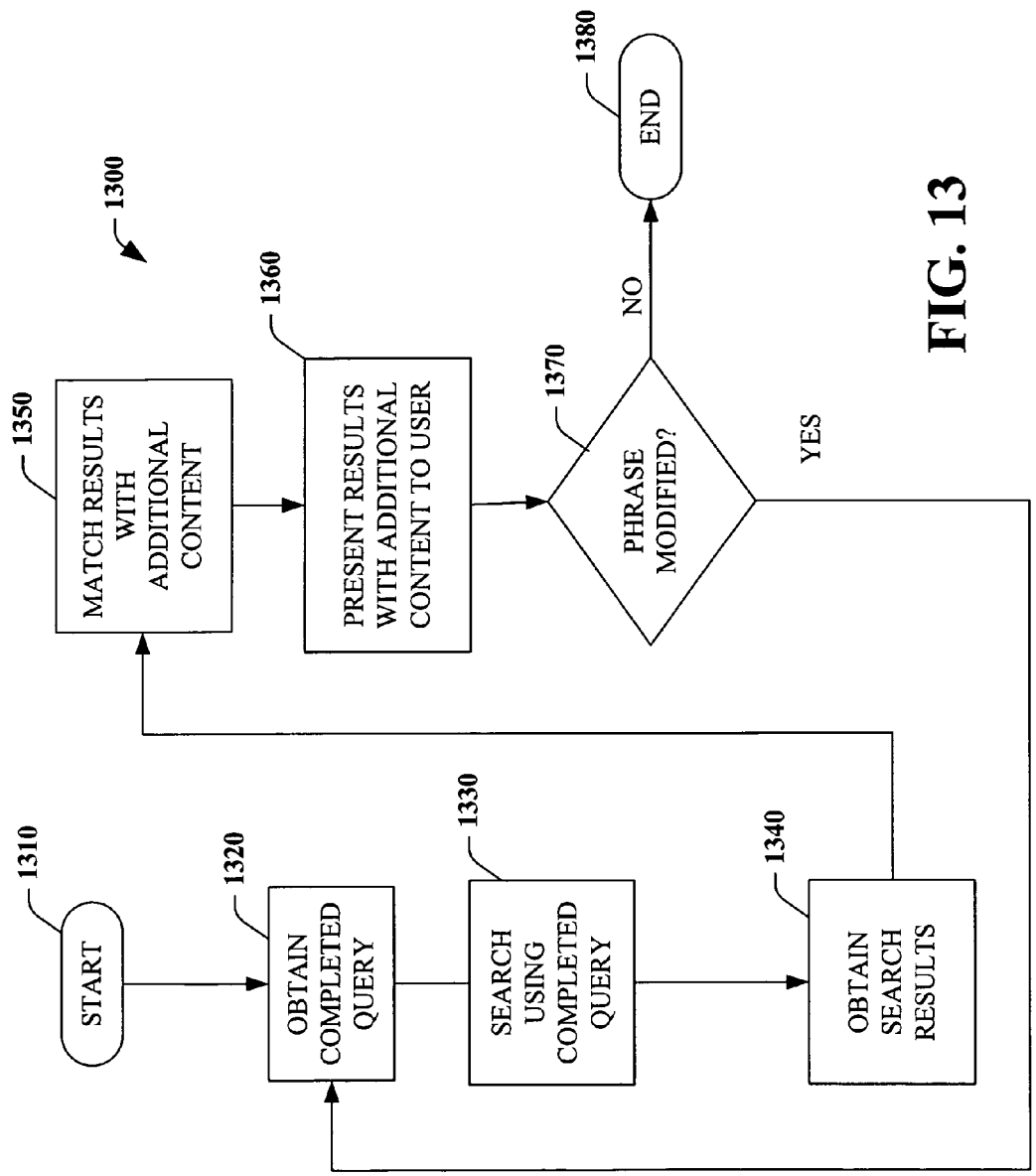
FIG. 13 is a flow diagram showing processing of a method that can be used in conjunction with components disclosed or described herein.

FIG. 13 is a flow diagram of a general processing flow of the method 1300 that can be used with the dynamic search client. The method 1300 can be used in conjunction with one or more of the dynamic search client systems disclosed and described in conjunction with previous figures. Specifically, the method 1300 can be used to provide additional content, such as advertising, and that can be keyed to a specific user query and change as the user query changes.

Processing of the method 1300 begins at start block 1310 and continues to process block 1320. At process block 1320, a completed query based upon a suggestion is obtained. The completed query can be created by a dynamic search client that provides suggestions, such as one or more of the dynamic search clients that have been disclosed and described in conjunction with previous figures. Processing continues to process block 1330 where a search that uses the completed query is performed. Specifics of the search, as will be readily recognized by those of ordinary skill in the art, can vary depending upon a specific search system employed and other implementation aspects.

At process block 1340, results of the search before the process block 1330 are obtained. Processing continues at process block 1350 where the search results are matched with additional content. A variety of specific approaches can be used to match additional content with the search results, including using the search query to obtain additional content that is responsive to the query and analyzing the search results to create a second search query that can be used to identify and obtain additional content to be matched, among others. In this manner, additional content such as advertising can be keyed to specific interests of the user.

Processing continues at process block 1360 where results of the search based upon the completed query are presented to the user along with the matched additional content. At decision block 1370, a determination is made whether the suggestion upon which the completed query originally obtained has changed. Such a change can be initiated by a user refining a phrase or creating a new phrase, among other things. If the determination is yes, processing returns to process block 1320 where a new completed query is obtained. If the determination from decision block 1370 is no, processing terminates at end block 1380.

Figure 14:
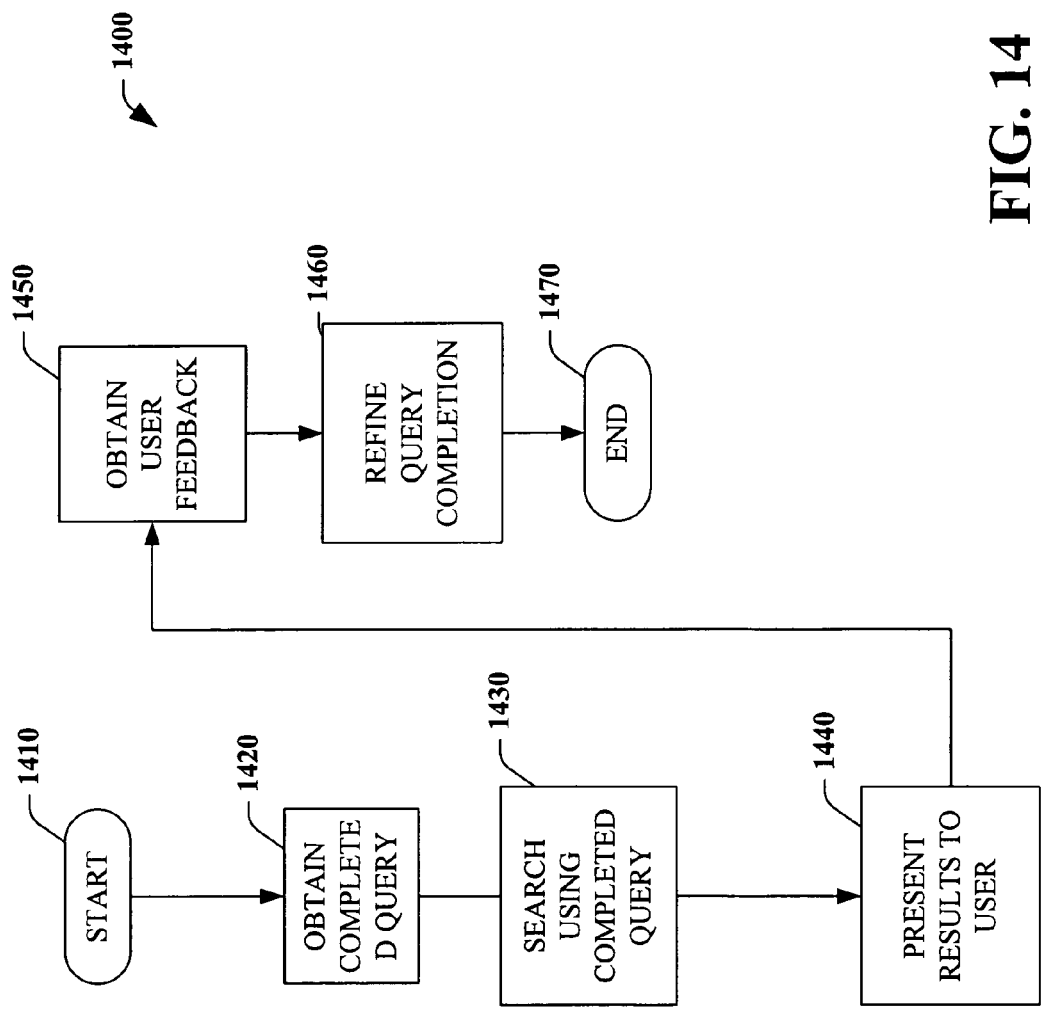
FIG. 14 is a flow diagram showing processing of a method that can be used in conjunction with components disclosed or described herein.

FIG. 14 is a flow diagram of a general processing flow of a method 1400 that can be used with one or more of the dynamic search clients disclosed and described in conjunction with other figures. Specifically, the method 1400 can be used to obtain user feedback regarding the quality of a completed query for use in improving for future query completions. Such user feedback can take a variety of forms, specifically including forms that can be used in a scoring system.

Processing of the method 1400 begins at start block 1410. Processing continues to process block 1420 where a completed query that is based at least in part upon a suggestion is obtained. The complete query can be created by a dynamic search client that provides suggestions, such as one or more of the dynamic search clients that have been disclose and described in conjunction with previous figures. At process block 1430, a search is performed using the complete query and a set of search results that are responsive to the completed query is obtained. Those of ordinary skill in the art will readily recognize that specifics of the query, the search that is performed using that query, and the set of results that is obtained will vary based upon, among other things, specific implementation details.

At process block 1440, results from a set of results are presented to user. Processing continues to process block 1450 where user feedback is obtained. In this specific example, it can be assumed that results in a set of results are ranked and that an overall level of quality of the results in the set is a suitable proxy for a level of quality of the completed user query. Ideally, a completed query that is used to perform a search will result only in those items of information that are exactly what the user desired. However the ideal case is seldom, if ever, realized and steps can be taken to improve completed queries and thereby improve the quality of search results that are presented to the user.

User feedback can be obtained in a variety of ways. One such way is to track user interaction with individual items in the result set to and use associated rankings of those results as part of a scoring system for a query completion that was applied. For example, if a user accesses a search result that was ranked first in a set of search results, a certain number of points can be added to a score associated with the search completion used. Additionally or alternatively, if the user accesses a result that was ranked lowly, points can be deducted from an associated score.

Another possible means of obtaining a score to be applied to a query completion includes asking a user to indicate whether a particular result is within a class of results expected by the user. Such an indication can be binary in the sense that a user can simply check a box or activated radio button or use some other means to indicate whether a result was responsive to query intended by the user. Additionally or alternatively, a user can be asked to apply a score to the result set as whole, for example, a rating for the result set ranging from one to ten, or, to apply a score to an individual result within the set from which a score to be applied to the query completion can be derived. At process block 1460, a query completion is refined. Details of refinement of a query completion can and usually will vary according to specific implementation details. Processing of the method 1400 terminates at END block 1470.

In connection with prediction, learning, or inference-based tasks, various artificial intelligence-based schemes or components can be used for carrying out or implementing certain ones of the components disclosed and described herein. For example, inference of a query completion can be facilitated by using an automatic classifier system and process. Additionally, scoring functions that are applied to query completions can be improved or otherwise facilitated by using artificial intelligence-based components.

A classifier is a function that maps an input attribute vector, $X=(x_1, x_2, x_3, x_4, \ldots x_n)$, to a confidence that the input belongs to a class, that is, $f(X)$=confidence(class). Such a classification can employ a probabilistic and/or statistical-based analysis (for example, factoring into the analysis utilities and costs) to predict or infer an action that a user desires to be automatically performed. In the case of suggestions, a classifier can identify a pattern that indicates a particular or likely desired suggestion. Upon such identification, the classifier can trigger a completion task automatically.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, for example, naive Bayes, Bayesian networks, decision trees, and probabilistic classification models providing different patterns of independence can be employed. Classification as used herein also includes statistical regression that is utilized to develop models of priority.

As will be readily appreciated from the subject specification, classifiers that can be employed includes those classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including, but not limited to, scoring suggestions for further refinement or improvement actions.

Figure 15:
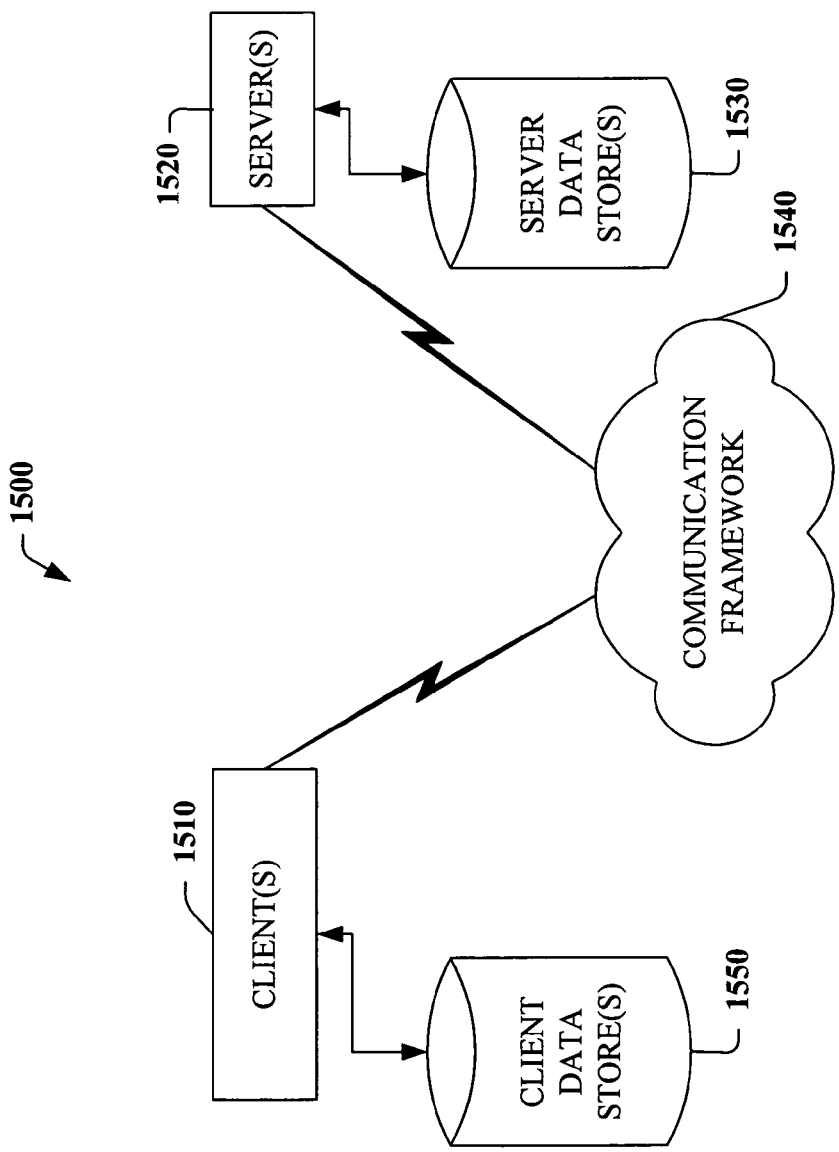
FIG. 15 is a schematic block diagram of a sample-computing environment.

In order to provide additional context for implementing various aspects of the subject invention, FIGS. 15-16 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 15 is a schematic block diagram of a sample-computing environment 1500. The system 1500 includes one or more client(s) 1510. The client(s) 1510 can be hardware and/or software (e.g., threads, processes, computing devices). The system 1500 also includes one or more server(s) 1520. The server(s) 1520 can be hardware and/or software (e.g., threads, processes, computing devices). The servers 1520 can house threads or processes to perform transformations by employing the subject invention, for example.

One possible means of communication between a client 1510 and a server 1520 can be in the form of a data packet adapted to be transmitted between two or more computer processes. The system 1500 includes a communication framework 1540 that can be employed to facilitate communications between the client(s) 1510 and the server(s) 1520. The client(s) 1510 are operably connected to one or more client data store(s) 1550 that can be employed to store information local to the client(s) 1510. Similarly, the server(s) 1520 are operably connected to one or more server data store(s) 1530 that can be employed to store information local to the servers 1540.

With reference to FIG. 16, an exemplary environment 1600 for implementing various components includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. For example, FIG. 16 illustrates a disk storage 1624. The disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

The various types of volatile and non-volatile memory or storage provided with the computer 1612 can be used to store components of various implementations of the data port signaling system disclosed and described herein. For example, with reference to FIG. 1, the guide engine 130 can be implemented as a software module that can be stored on the disk storage 1624. At runtime, the guide module 130 can be loaded into the volatile memory 1620 from where machine-interpretable code can be accessed by the processing unit 1614 and thereby placed into execution.

It is to be appreciated that FIG. 16 describes software that acts as an intermediary between users and the basic computer resources described in the suitable operating environment 1600. Such software includes an operating system 1628. The operating system 1628, which can be stored on the disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the disclosed components and methods can be implemented with various operating systems or combinations of operating systems.

A user enters commands or information into the computer 1612 through input device(s) 1636. The input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640.

Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for guiding a search for information, comprising:
   a processor for executing the following software components:
   a user interface that accepts a phrase and receives at least one suggestion based at least in part on the phrase, wherein the user interface includes a handwriting processing component that accepts handwritten data input to recognize the phrase and includes a speech processing component that accepts an audio data input to recognize the phrase;
   a phrase suggestion engine that matches the phrase with the at least one suggestion, wherein the phrase suggestion engine interacts with the user interface to assist in providing suggestions, and which takes into account context and most likely desired results, in order to maximize likelihood that a user obtains responsive information to its query;
   wherein the phrase suggestion engine suggests queries that include sound-alike phrases, substitute phrases, spelling correction phrases, noisy input correction phrases and grammar correction phrases based upon available dictionary words, past searches by the user and phrases from a phrase data store;
   a search engine that provides a result set based at least in part upon a query created using the suggestion;
   wherein upon completion of a query that includes one or more suggested phrases, the user interface sends the query to the search engine which performs the searches incrementally as each individual phrase is suggested by the phrase suggestion engine, the user interface provides dynamically updated search results based upon a continuously-evolving search query that is based at least in part upon suggestions, the search engine then uses previous result sets and performs additional search tasks on the query as the user enters additional data;
   a feedback module that adjusts a manner in which the query would otherwise be completed, the feedback module provides information and assists the phrase suggestion engine in suggesting a partial query for the user based on a user's interactions with results of previous search queries, and searches and search queries from other users; and
   a result display component that displays at least a part of the result set from the search engine; and
   wherein the user interface further comprises a presentation component that presents the suggestion to the user.

2. The system of claim 1, wherein the user interface is at least one of a command line interface, a text-based interface, a graphical user interface, a web-based interface, a stylus-based interface, a pen-based data input system, a keypad, a speech recognition system, and a handwriting recognition system.

3. The system of claim 2, wherein the phrase is one of a prefix, a regular expression, a suffix, an infix, a pattern, a substring, and a string.

4. A method of guiding a search for information stored in a machine-readable format, comprising:
   creating a suggestion from a phrase entered by a user at a user interface via the user interface accepting the phrase and receiving at least one suggestion based at least in part on the phrase, wherein the user interface includes a handwriting processing component that accepts handwritten data input to recognize the phrase and includes a speech processing component that accepts an audio data input to recognize the phrase, and wherein creating a suggestion includes referencing a set of suggestions and referencing a probability measure;
   creating at least one query based at least in part upon the suggestion;
   utilizing a handwriting processing component that accepts handwritten data input to recognize the suggestion;
   searching for results that are based at least in part upon a query derived from the suggestion;
   suggesting queries that include sound-alike phrases, substitute phrases, spelling correction phrases, noisy input correction phrases and grammar correction phrases;
   sending the query to a search engine which performs the searches incrementally as each individual phrase is suggested by a phrase suggestion engine, the user interface provides dynamically updated search results based upon a continuously-evolving search query that is based at least in part upon suggestions, the search engine then uses previous result sets and performs additional search tasks on the query as the user enters additional data; and
   outputting the results to a computer display to allow a user to review the results, wherein a user interface provides dynamically updated search results based upon a continuously-evolving search query that is based at least in part upon suggestions.

5. The method of claim 4, wherein referencing a set of suggestions includes referencing a ranking of suggestions.

6. The method of claim 4, further comprising presenting results that are based at least in part upon the query.

7. A system for guiding a search for information stored in a machine-readable format, comprising:
   a computer memory;
   means for creating a suggestion from a phrase entered by a user at a user interface via the user interface accepting the phrase and receiving at least one suggestion based at least in part on the phrase, wherein the user interface includes a handwriting processing component that accepts handwritten data input to recognize the phrase and includes a speech processing component that accepts an audio data input to recognize the phrase, and wherein the means for creating a suggestion includes means for referencing a set of suggestions and means for referencing a probability measure;
   means for creating at least one query based at least in part upon the suggestion;
   means for storing the at least one query in the computer memory;
   means for utilizing a handwriting processing component that accepts handwritten data input to recognize the suggestion;

means for searching for results that are based at least in part upon a query derived from the suggestion;

means for suggesting queries that include sound-alike phrases, substitute phrases, spelling correction phrases, noisy input correction phrases and grammar correction phrases;

means for sending the query to a search engine which performs the searches incrementally as each individual phrase is suggested by a phrase suggestion engine, the user interface provides dynamically updated search results based upon a continuously-evolving search query that is based at least in part upon suggestions, the search engine then uses previous result sets and performs additional search tasks on the query as the user enters additional data; and means for outputting the results to a computer display to allow a user to review the results, wherein a user interface provides dynamically updated search results based upon a continuously-evolving search query that is based at least in part upon suggestions.

8. The system of claim 7, wherein the means for referencing a set of suggestions includes means for referencing a ranking of suggestions.

9. The system of claim 7, further comprising means for searching for results that are based at least in part upon a query derived from the suggestion.

10. The system of claim 9, further comprising means for presenting results that are based at least in part upon the query.

* * * * *